United States Patent
Covic et al.

(10) Patent No.: US 11,869,707 B2
(45) Date of Patent: Jan. 9, 2024

(54) DOUBLE CONDUCTOR SINGLE PHASE INDUCTIVE POWER TRANSFER TRACKS

(71) Applicant: AUCKLAND UNISERVICES LIMITED, Auckland (NZ)

(72) Inventors: Grant Anthony Covic, Auckland (NZ); Stefan Raabe, Bayern (DE)

(73) Assignee: AUCKLAND UNISERVICES LIMITED, Auckland (NZ)

( * ) Notice: Subject to any disclaimer, the term of this patent is extended or adjusted under 35 U.S.C. 154(b) by 0 days.

(21) Appl. No.: 17/222,698

(22) Filed: Apr. 5, 2021

(65) Prior Publication Data

US 2021/0296047 A1   Sep. 23, 2021

Related U.S. Application Data

(63) Continuation of application No. 14/233,261, filed as application No. PCT/NZ2012/000127 on Jul. 19, 2012, now Pat. No. 10,971,300.

(30) Foreign Application Priority Data

Jul. 19, 2011   (NZ) .................................... 594158

(51) Int. Cl.
| | | |
|---|---|---|
| H01F 38/14 | (2006.01) | |
| B60L 53/12 | (2019.01) | |
| H02J 3/00 | (2006.01) | |
| H02J 50/70 | (2016.01) | |
| H02J 50/12 | (2016.01) | |
| B60L 53/30 | (2019.01) | |
| H02J 50/40 | (2016.01) | |

(52) U.S. Cl.
CPC .............. *H01F 38/14* (2013.01); *B60L 53/12* (2019.02); *B60L 53/30* (2019.02); *H02J 3/00* (2013.01); *H02J 50/12* (2016.02); *H02J 50/402* (2020.01); *H02J 50/70* (2016.02); *B60L 2210/10* (2013.01); *B60L 2210/30* (2013.01); *B60L 2210/40* (2013.01); *B60L 2270/147* (2013.01); *Y02T 10/70* (2013.01); *Y02T 10/7072* (2013.01); *Y02T 10/72* (2013.01); *Y02T 90/12* (2013.01); *Y02T 90/14* (2013.01)

(58) Field of Classification Search
CPC . H01F 38/14; H02J 50/12; H02J 50/40; H02J 50/70; B60L 53/12; B60L 53/30
USPC .......................................................... 307/104
See application file for complete search history.

(56) References Cited

U.S. PATENT DOCUMENTS

| | | | | |
|---|---|---|---|---|
| 5,923,544 A | * | 7/1999 | Urano | .................. H02M 3/3382 320/108 |
| 6,515,878 B1 | * | 2/2003 | Meins | ..................... H02M 7/48 191/10 |

(Continued)

FOREIGN PATENT DOCUMENTS

WO    WO-2011145953 A1 *  11/2011   .............. B60L 5/005

*Primary Examiner* — Rexford N Barnie
*Assistant Examiner* — Swarna N Chowdhuri
(74) *Attorney, Agent, or Firm* — Pilloff Passino & Cosenza LLP; Martin J. Cosenza

(57) ABSTRACT

An IPT track arrangement including a power supply and conductor electrically connected to the power supply, the conductor includes a plurality of loops located substantially adjacent one another, wherein the polarity in adjacent portions of the loops is the same, and wherein the power supply includes a one or more inverters which share the track load.

30 Claims, 17 Drawing Sheets

(56) References Cited

U.S. PATENT DOCUMENTS 10,600,564 B2 * 3/2020 Budhia ................ B60L 53/30
2013/0229061 A1 * 9/2013 Budhia ................ H02J 50/10
                                                                                                307/104

* cited by examiner (a)

(b)

(c)

(a)

(b)

(c)

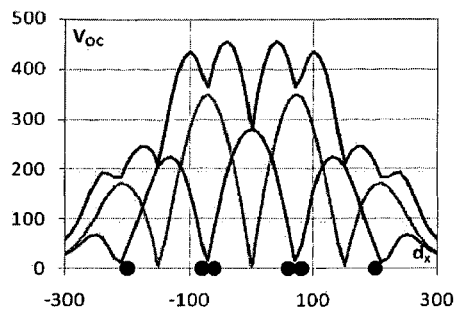
(a)
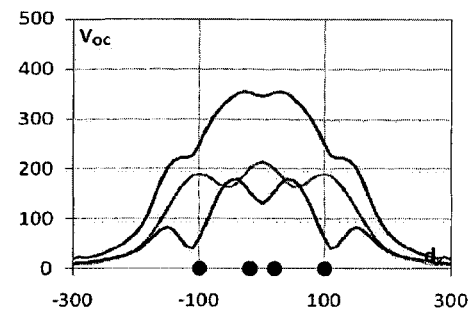
(a)
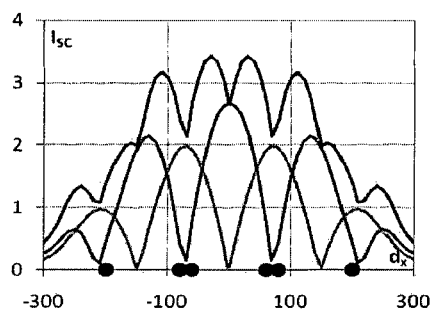
(b)
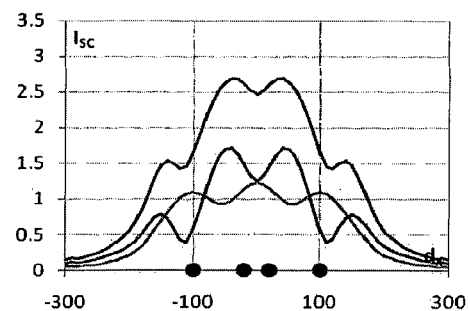
(b)
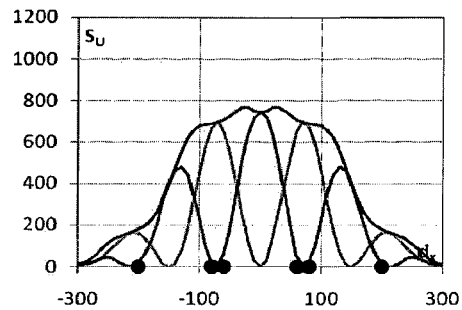
(c)
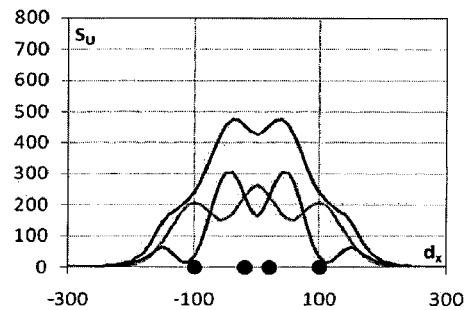
(c)
FIGURE 15
FIGURE 16

(a)

(b)

(c)

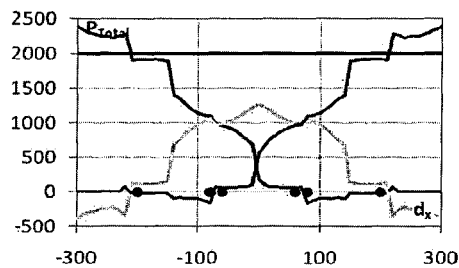
(a)
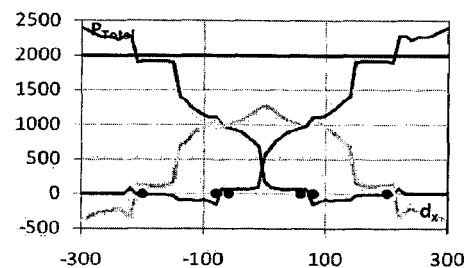
(a)
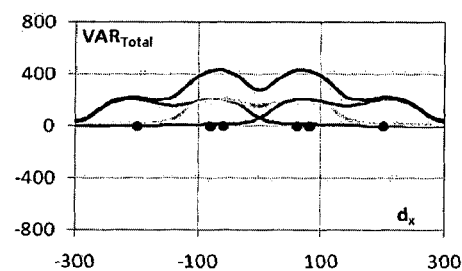
(b)
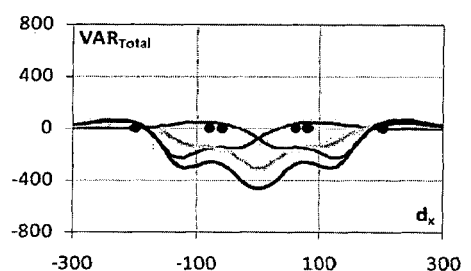
(b)
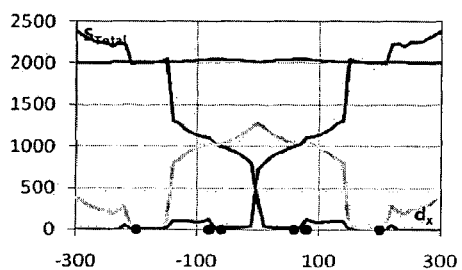
(c)
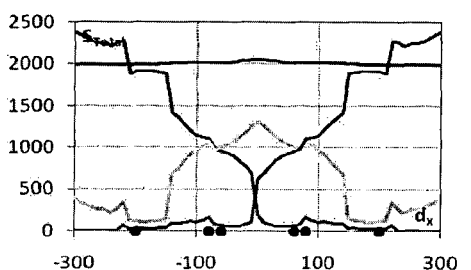
(c)
FIGURE 18A
FIGURE 18B

DOUBLE CONDUCTOR SINGLE PHASE INDUCTIVE POWER TRANSFER TRACKS

FIELD OF INVENTION

The invention relates to Inductive Power Transfer (IPT) systems. In particular, the invention relates to an improved track and a pickup for use with the track.

BACKGROUND

IPT uses a varying magnetic field to couple power across an air gap, to a load, without physical contact. The air gap is present between a primary conductor such as an elongate loop of conductive material (generally referred to in this document as a track), and one or more pick-up devices that have a secondary coil which receive power from the magnetic field associated with the track. System performance is not affected by wet or dirty environments and there are no safety risks under such conditions since the components are completely isolated. IPT is reliable and maintenance free unlike conventional plug or brush and bar contact based methods such as those used on trams and electric buses. IPT is presently used in numerous industrial applications such as materials handling and IC fabrication. The systems vary in capacity from 1 W-200 kW and can be used to both power and recharge robots, Automatic Guided Vehicles (AGV), electronic devices, recreational people movers, buses and Electric Vehicles (EVs). IPT systems may be divided into two distinct types: distributed systems that consist of one or more movable loads that may be placed anywhere on a track, and lumped systems that only allow power transfer at a defined location.

Distributed systems are particularly suited to Roadway Powered EV (RPEV) applications, however practical large scale RPEV systems have so far been infeasible. This is due to the large horizontal tolerance (~700 mm) and ground clearance (150-200 mm) required by unguided EVs. The track topology presented in this document offers a significant improvement over previous designs by allowing increased horizontal tolerance with minimal increase to the system cost. Those skilled in the art will appreciate that this document predominantly refers to applications of the invention in the context of AGVs, but the invention is applicable to many other IPT system applications. For example, if ferromagnetic materials (such as ferrite) are associated with the track arrangements disclosed herein, then the invention may have applicability to IPT systems for EVs and RPEVs.

EVs help reduce dependence on fossil fuels, emission of greenhouse gasses and emission of pollutants. Consequently, uptake of EVs has been increasing since the 1990's however market penetration has been low because EVs are not as cost effective as conventional vehicles. The present EV market is dominated by hybrid vehicles that derive their energy from a combustion engine, however, plug-in EVs (PHEV) have recently been introduced enabling energy from the grid to mitigate gasoline consumption. In order for EVs to gain widespread adoption, major improvements are required in battery life and cost, and grid connection. The latter allows opportunistic charging after each trip rather than a long charge at the end of the day. As a result battery wear is significantly reduced by minimising the depth of discharge and the EV has a lower cost since a smaller battery is required. The preferred solution that makes EVs more cost effective than gasoline vehicles is to power and recharge the EV via the road. It should be noted that the infrastructure for such a dynamic charging system could be relatively small because travel on interstate highways makes up 1% of roadway miles but carries 22% of all vehicle miles travelled. An EV that has 50% of its driven miles connected to a dynamic charging system would be as cost effective as a conventional vehicle and does not incur additional gasoline costs.

An IPT system comprises three main components that are shown for a single phase system in FIG. 1, which is based on an example of use in a roadway. The power supply produces a sinusoidal current (usually in the 10-40 kHz frequency range) that drives a current ($I_1$) in an inductive primary conductive path, or track. Although not shown in FIG. 1, the track comprises (but is not limited to) part of an LCL network with the track inductance $L_1$ comprising the final "L" of the network. The parallel compensation capacitor $C_1$ allows the track current, $I_1$, to resonate, increasing the magnetic field strength in the vicinity of the track. This minimises the VA rating of the power supply for a given load. The track and Pick Up (PU) act as a loosely coupled transformer, enabling power transfer over relatively large air gaps. The IPT PU inductance, $L_2$, is tuned for resonance with $C_2$. This compensates for the relatively large PU leakage inductance. The voltage across $C_2$ is rectified and a switched mode controller enables the resonant tank to operate at a defined quality factor, Q, to boost power transfer and provide a usable DC output. The power output of an IPT system ($P_{out}$) is quantified by the open circuit voltage ($V_{oc}$) and short circuit current ($I_{sc}$) of the PU as well as the quality factor as shown in (1).

$$P_{out} = P_{su}^* Q = V_{oc}^* I_{sc}^* Q = \omega M I_1 \frac{M I_1}{L_2} * Q = \omega I_1^2 \frac{M^2}{L_2} Q \qquad (1)$$

$P_{su}$ is the uncompensated power, $\omega$ is the angular frequency of the track current $I_1$, M is the mutual inductance between the track and PU. As shown in (1), the output power is dependent on the power supply ($\omega I_1^2$), magnetic coupling ($M^2/L_2$) and PU controller (Q).

Increasing the power output and separation between the track and PU is highly desirable but efficiency is limited by the operational frequency (switching loss) and current rating (copper loss) of the system. Allowing a system to operate at a high Q boosts power transfer but in practical applications it is normally designed to operate between 4 and 6 due to component VA ratings and tolerances. Due to these limits, the greatest increase in system performance can be achieved by good magnetic design.

In order to improve horizontal tolerance, a three phase track topology as shown in FIG. 2 (a) has been previously proposed. The vehicle drives along the length of the track, Tx, which is referred to as the x-axis. The system uses an inductor-capacitor-inductor (LCL) impedance converting network that converts the voltage sourced inverter into a current source suitable for driving the inductive track. The leakage inductance of the isolating transformer is used as the first inductor and the track forms the last inductor, so that only real power passes through the transformer. Large reactive currents ($I_1$ in FIG. 1) circulate in the track and capacitor only. Three individual isolating transformers connected in a delta-delta configuration were used for each phase, however the output terminals of the transformers were connected directly to the start and return of each track loop resulting in a six wire track. This track topology is termed "bipolar" in this document because the PU is exposed to both forward and returning currents to the supply.

The overlapping nature of the track phases results in currents that differ by 60° in each adjacent wire and in a similar manner to windings in a cage induction motor, this creates a travelling field across the width (Ty) of the track. This moving field results in a wide and even power profile with a simple single coil PU.

However, a consequence of having overlapping tracks is the presence of mutual inductance between phases, so that energy from one track phase couples into adjacent phases, similar to the power coupling between each track conductor and the PU. This cross coupling causes different legs in the inverter to source large currents and the DC bus voltage surges as energy is fed into the inverter. Two approaches were shown to solve the mutual inductance problem. Firstly the area of overlap between track loops can be changed to reduce the mutual inductance—however this results in a non-uniform track spacing that affects the smoothness of the power profile across the width of the track. Secondly, a flux cancelling approach can be used where transformer coupling is introduced at the start of the track to create coupling between phases that is out of phase with the coupling between the tracks along the length due to geometry. This is implemented by appropriately looping the track through toroidal cores at the start. The first technique minimises the effect of interphase mutual inductance but resulted in either poorer performance in the coupled PU, while the second has good performance but added expense due to the extra magnetic components required.

There is therefore a need to provide a track with an enhanced lateral range with an improved (e.g. smoother) power profile.

OBJECT OF THE INVENTION

It is an object of the invention to provide an arrangement which at least ameliorates one or more of the above-mentioned problems, or to at least provide the public with a useful choice.

BRIEF SUMMARY OF THE INVENTION

In a first aspect, the invention broadly provides an IPT track arrangement including a power supply and conductor means electrically connected to the power supply, the conductor means including a plurality of loops located substantially adjacent one another, wherein the polarity in adjacent portions of the loops is the same, and wherein the power supply includes on or more inverters.

Preferably the inverters share the load on the track arrangement.

Preferably the inverters are electrically connected together in parallel.

Preferably, the conductor means includes a single conductor, wherein, in forming the loops, the conductor overlaps itself at a plurality of points.

Preferably, the distance between adjacent loops is substantially smaller than the width of the loop.

Preferably, the plurality of loops includes at least two loops.

In another embodiment the plurality of loops comprises at least three loops.

In a second aspect, the invention broadly provides an IPT track arrangement including a power supply and conductor means electrically connected to the power supply, the conductor means including a single conductor forming a plurality of loops located substantially adjacent one another, wherein the polarity in adjacent portions of the loops is the same.

Preferably, the power supply includes an inverter.

Preferably, the distance between adjacent loops is substantially smaller than the width of the loop.

Preferably, the plurality of loops includes at least two loops.

In another embodiment the plurality of loops comprises at least three loops.

In a third aspect, the invention broadly provides an IPT pickup adapted to be used with an IPT track arrangement according to the first or second aspects, wherein the IPT pickup is adapted to receive both horizontal and vertical components of the magnetic flux generated by the IPT track arrangement.

Preferably, the IPT pickup includes one or more of: a quadrature pickup, a DDP pad, a DDPQ pad, a BPRP pad.

In another aspect the invention broadly provides an IPT system, including an IPT track arrangement having a power supply and conductor means electrically connected to the power supply, the conductor means including a plurality of loops located substantially adjacent one another, wherein the polarity in adjacent portions of the loops is the same, and an IPT pickup.

Preferably the pickup comprises a plurality of coils.

Preferably the pickup is adapted to receive components of magnetic flux generated by the IPT track arrangement that are in spatial quadrature.

Preferably the the power supply includes a plurality of inverters electrically connected together in parallel.

Preferably the conductor means includes a single conductor forming the plurality of loops.

Preferably, in forming the loops, the conductor overlaps itself at a plurality of points.

Preferably, the distance between adjacent loops is substantially smaller than the width of the loop.

Preferably, the plurality of loops includes at least two loops.

In another embodiment the plurality of loops comprises at least three loops.

Preferably, the IPT pickup includes one or more of: a quadrature pickup, a DDP pad, a DDPQ pad, a BPRP pad.

In another aspect the invention provides an IPT system track arrangement comprising a plurality of elongate loops of conductive material wherein the polarity in adjacent portions of the loops is the same, and having a cross section substantially as shown in FIG. 12 or FIG. 20.

In other aspects, the invention broadly provides an IPT track arrangement, an IPT pickup and/or an IPT system substantially as herein described.

Further aspects of the invention will become apparent from the following description.

BRIEF DESCRIPTION OF FIGURES

Embodiments of the invention will now be described, by way of example only, with reference to the accompanying drawings, where:

FIG. 15 is a set of graphs showing the (a) open-circuit voltage ($V_{oc}$), (b) short-circuit current ($I_{sc}$) and (c) uncompensated power ($S_u$) of the track shown in FIG. 7;

FIG. 16 is a set of graphs showing the (a) open-circuit voltage ($V_{oc}$), (b) short-circuit current ($I_{sc}$) and (c) uncompensated power ($S_u$) of the track shown in FIG. 9;

FIG. 18A is a set of graphs showing (a) PTotal, (b) VARTotal and (c) STotal for a series tuned track as shown in FIG. 7;

FIG. 18B is a set of graphs showing (a) PTotal, (b) VARTotal and (c) STotal for a parallel tuned track as shown in FIG. 7;

DETAILED DESCRIPTION

In this specification, the term "track" is used to refer to the primary circuit of the IPT arrangement. However this should not be construed as limiting the invention to use in vehicles or the like.

Track Arrangement

Figure 19:
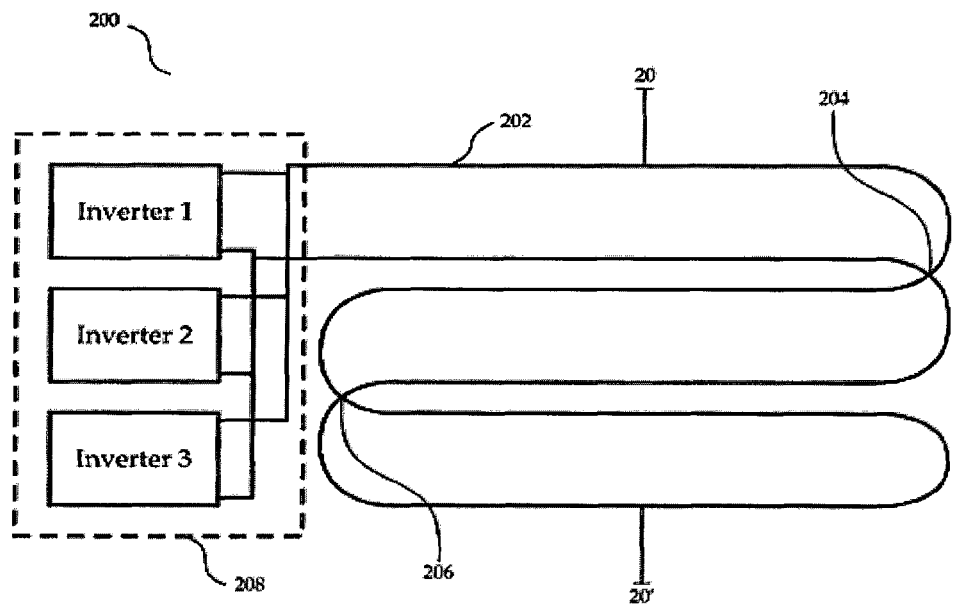
FIG. 19 shows a track according to one embodiment of the present invention.

Referring first to FIG. 19, there is shown a track 200 including a conductor 202 connected to a power source 208. Conductor 202 is arranged so as to form three loops substantially in a plane, although it will be appreciated by those skilled in the art that more or fewer loops may be provided without deviating from the invention. The loops are formed by conductor 202 overlapping itself at two distinct points 204 and 206 such that each of the three loops are substantially the same shape and size, the loops being substantially adjacent one another. The distance between adjacent sides is reduced, and may be zero, or another low value relative to the width of the loop.

In order to safely operate, conductor 202 must have sufficient cross sectional area for the rated track current, and the resulting cable diameter restricts the spacing between the adjacent cables. Additionally, the cable insulation and any supporting material will add further thickness to the cable. For example, a Litz cable of approximately 15 mm diameter may be used for track currents of 125 A. As a result, a spacing of 20 mm may be used between adjacent cables. However, the selection of an appropriate conductor and the appropriate spacing between adjacent conductors will be clear to a person skilled in the art, and accordingly it is not necessary to go into any further detail here.

In the embodiment shown, the loops are shaped substantially like rounded rectangles, having two substantially elongate straight sides and two substantially round sides, where the loops are adjacent one another along their straight sides. The points 204 and 206 are located on the rounded sides, nearer the straight sides. It will be appreciated that the track layout shown in FIG. 19 is a diagrammatic example. Other configurations may be used.

The power source 208 may include either a single inverter which is rated to supply the total power of track 200 using a LCL network.

Figure 19A:
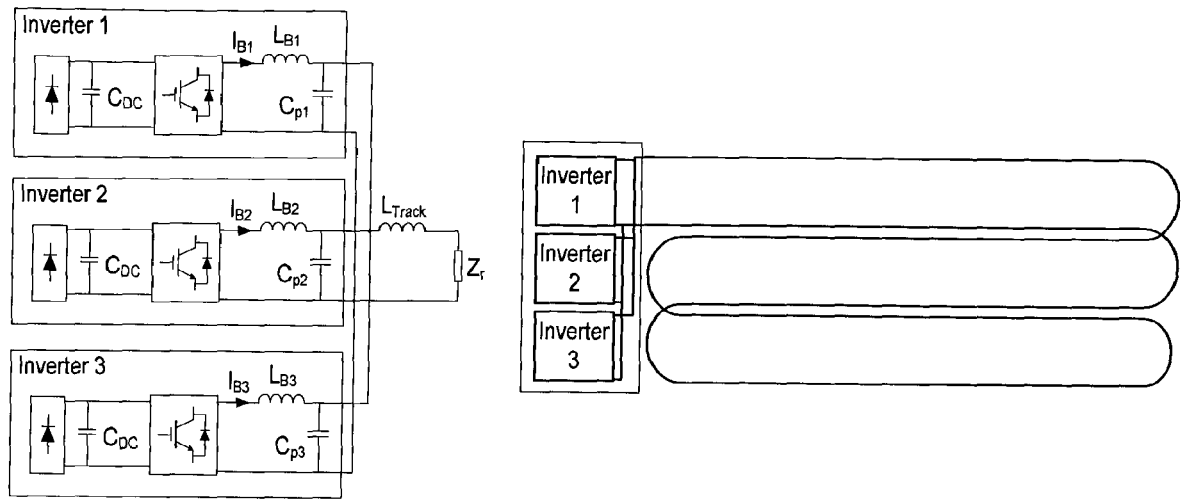
FIG. 19A shows an arrangement of three inverters and the LCL network associated therewith for the track shown in FIG. 19.

In alternative embodiments (and as depicted in FIG. 19) for example, power source 208 may include a plurality of inverters electrically connected together in parallel. Again, an LCL network may be used as shown in FIG. 19A. Preferably, the inverters are identical and are synchronised so as to be in phase with one another. The inverters are typically supplied from a common mains supply. As shown, individual rectifiers may be provided for each inverter, and if desired the rectifiers may be connected together to form a common DC bus. Alternatively, a single rectifier may be used to provide a common DC bus which supplies the inverters.

Figure 8:
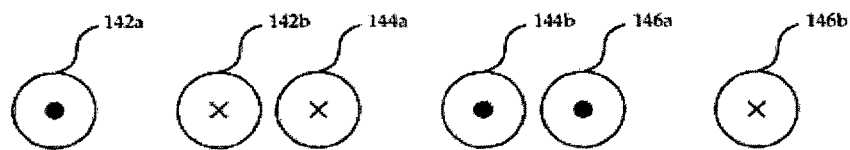
FIG. 8 is a diagram of the polarity of the track of FIG. 7, as taken along line 8-8'.

The polarity of track 200 is shown in FIG. 8, taken along line 8-8' of FIG. 19. In particular, it can be seen that adjacent portions of the loops share the same polarity. This avoids or reduces the disadvantages caused by opposition of the magnetic flux in adjacent portions, such as null spots or low-power zones.

In order to display the beneficial attributes of track 200, a number of known track arrangements were simulated and tested. The arrangements and results will be described in detail below.

Other Arrangements

Figure 1:
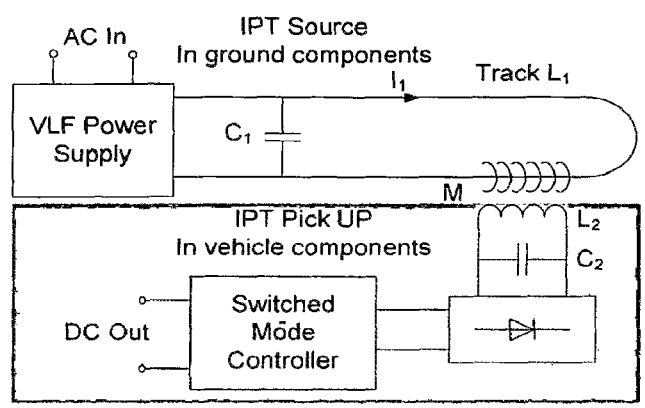
FIG. 1 is a diagram showing a known arrangement of IPT system components for a single phase track system.
Figure 2:
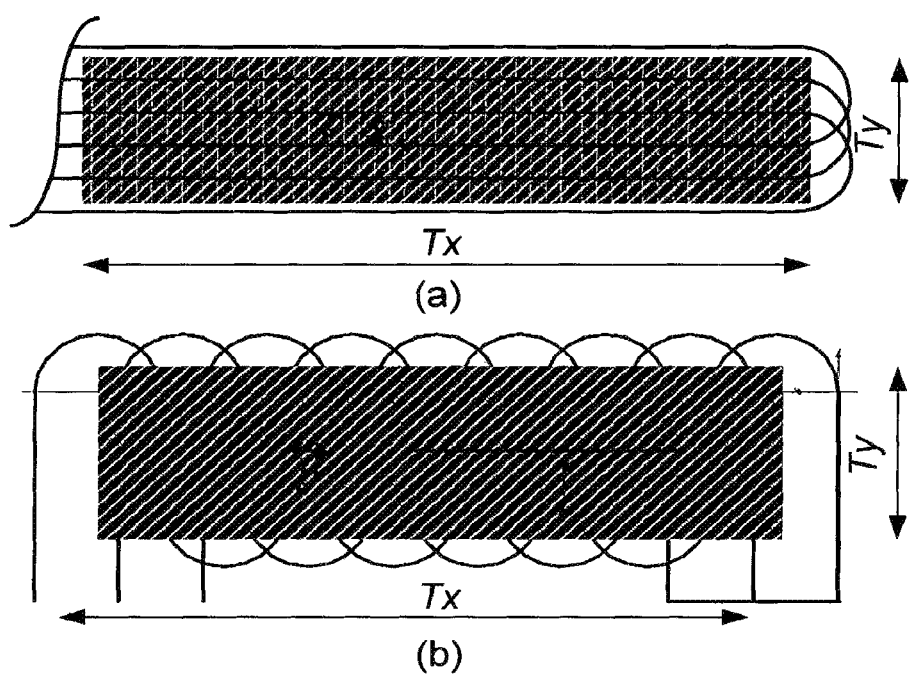
FIG. 2 is a diagram of three-phase IPT track topologies, where (a) is bipolar and (b) is unipolar.
Figure 3:
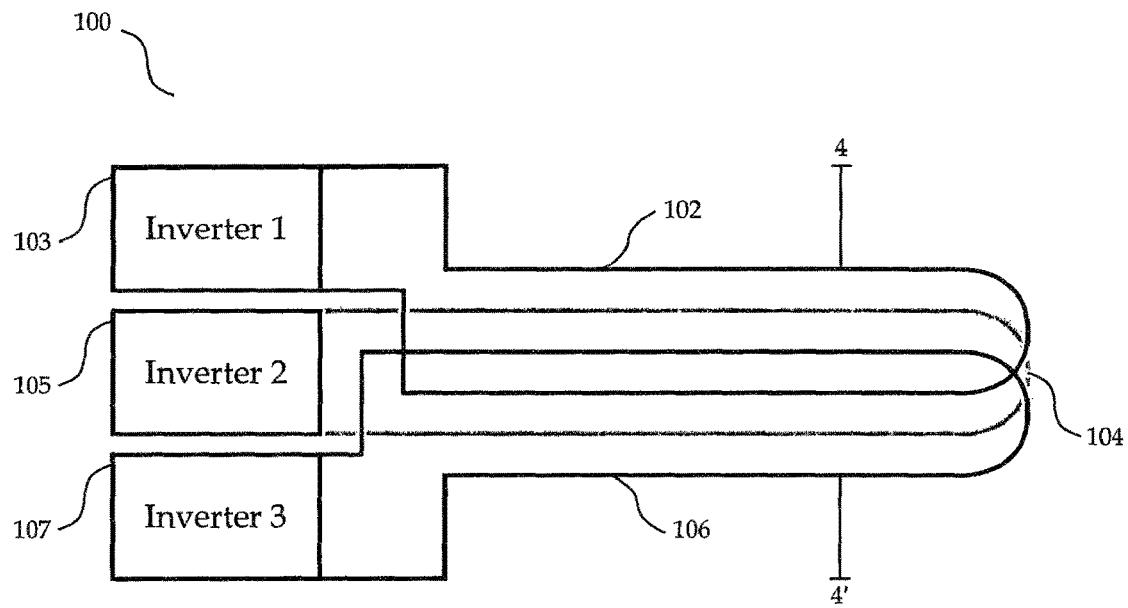
FIG. 3 is a diagram of a three-phase bipolar track.

FIG. 3 shows a three-phase bipolar track. The track 100 consists of three extended loops 102A, 102B and 102C, comprising six conductors, each loop intersecting with the other two loops near their distal ends, and again at their proximal ends. The loops 102A, 102B and 102C are each driven by an independent inverter 104A, 104B and 104C respectively, and carry currents which are equal in frequency and magnitude, but electrically separate in phase by 120°. A rectifier may be used to provide a common DC bus. The three inverters are equal except for the phase shift, and all three phases are each tuned with an LCL network as shown in FIG. 4A, which provides a constant track current independent of the loading on that phase. This is desirable as the portion of the total load that is born by each phase will change as the position of the pickup changes across the width of the track. The current in each phase is typically equal and held at least nominally constant by the power supply as well as the frequency of operation. In some situations phases may be controlled individually e.g. to make slight adjustments to account for component tolerances.

Figure 4:
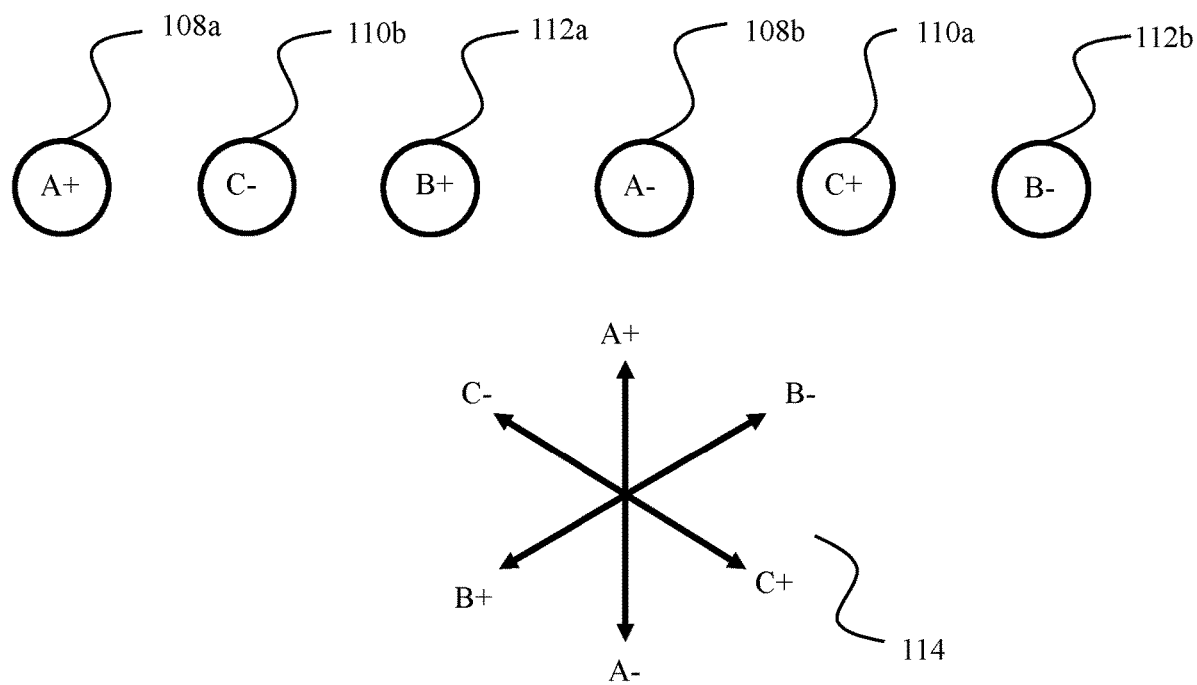
FIG. 4 is a diagram of the polarity of the track of FIG. 3, as taken along line 4-4'.
Figure 4A:
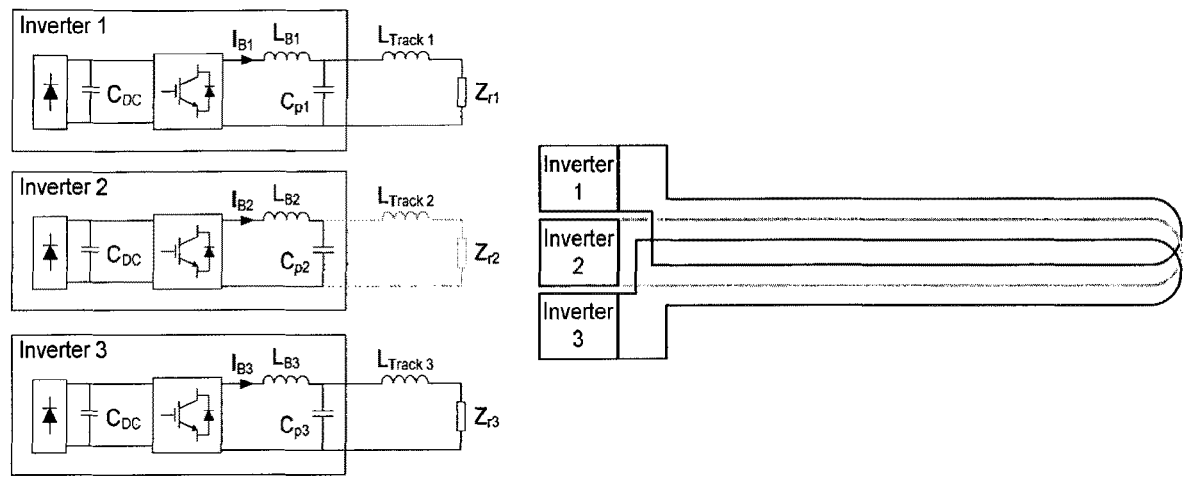
FIG. 4A shows the inverter and LCL network arrangement for implementing the track of FIG. 3.

FIG. 4 shows the polarity of the conductors of track 100, as taken through line 4-4' of FIG. 3. In particular, symbols 108a and 108b correspond to conductor 102 being in a first phase, symbols 110a and 110b correspond to conductor 104 being in a second phase and symbols 112a and 112b correspond to conductor 106 being in a third phase. Symbols 108a, 110a and 112a share the same polarity, and likewise symbols 108b, 110b and 112b share the same polarity. Phasor diagram 114 demonstrates the relative relationship between the various phases.

Figure 5:
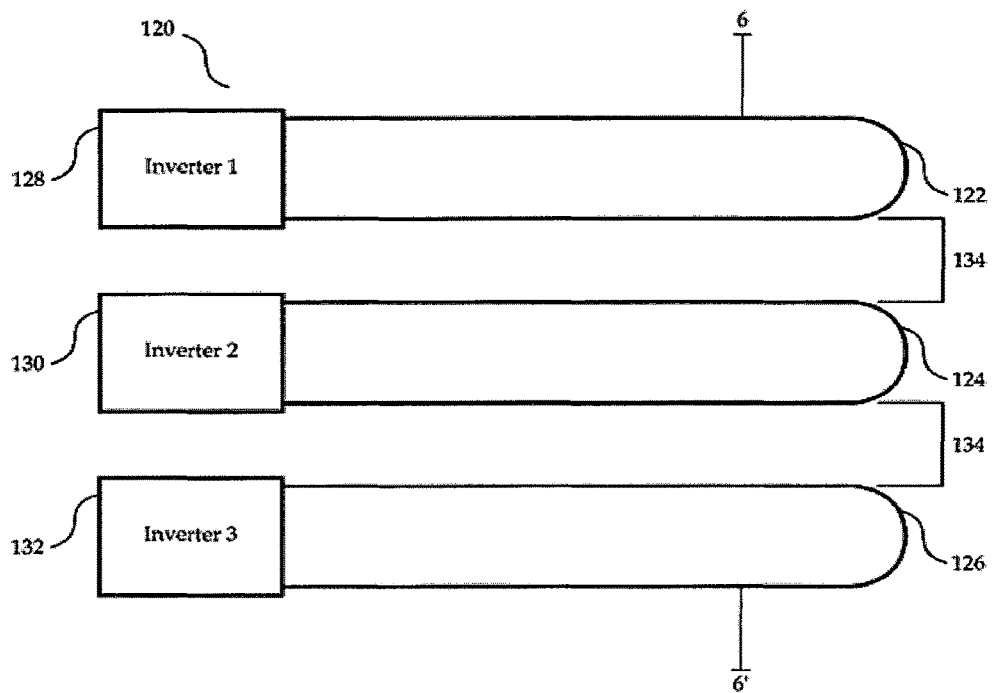
FIG. 5 is a diagram of a repeated single-phase track.

FIG. 5 shows a repeated single-phase track. Similarly to track 100 shown in FIG. 3, track 120 consists of three extended loops 122, 124 and 126, comprising six conductors. The track loops are each driven by a separate inverter 128, 130 and 132 respectively, and carry currents which are equal in frequency and magnitude, and substantially in phase with one another. Unlike track 100, the loops 122, 124 and 126 do not intersect, and are separated by track spacing 134, which may be the same as the width of one of the loops.

Figure 6:
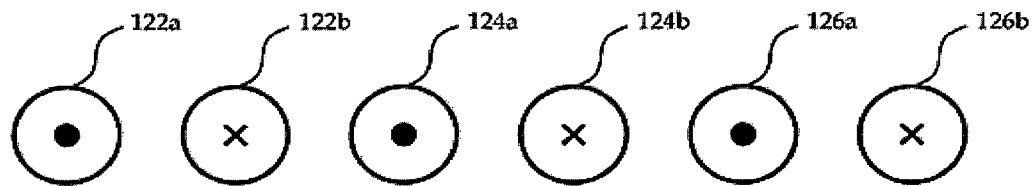
FIG. 6 is a diagram of the polarity of the track of FIG. 5, as taken along line 6-6'.

FIG. 6 shows the polarity of the conductors of track 120, as taken through line 6-6' of FIG. 5. Symbols 122a and 122b correspond to the lengths of conductor 122, and similarly for symbols 124a and 124b and symbols 126a and 126b, and conductors 124 and 126 respectively. In particular, it should be noted that 122b and 124a and 124b and 126a, each of which correspond to adjacent sides of loops, share the same polarity. As previously noted in relation to track 200, this avoids or reduces the disadvantages caused by opposition of the magnetic flux, such as null spots or low-power zones.

Figure 7:
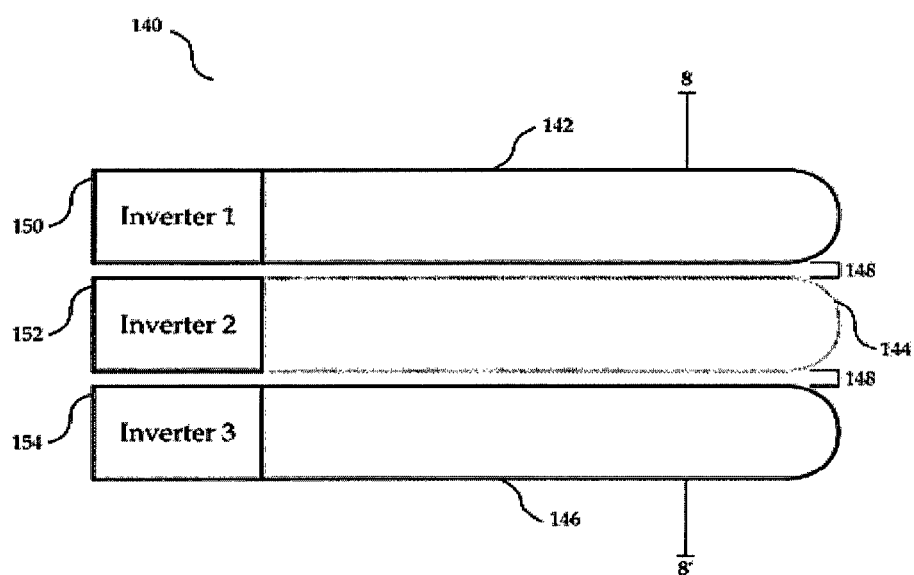
FIG. 7 is a diagram of a double conductor repeated single-phase track.
Figure 8A:
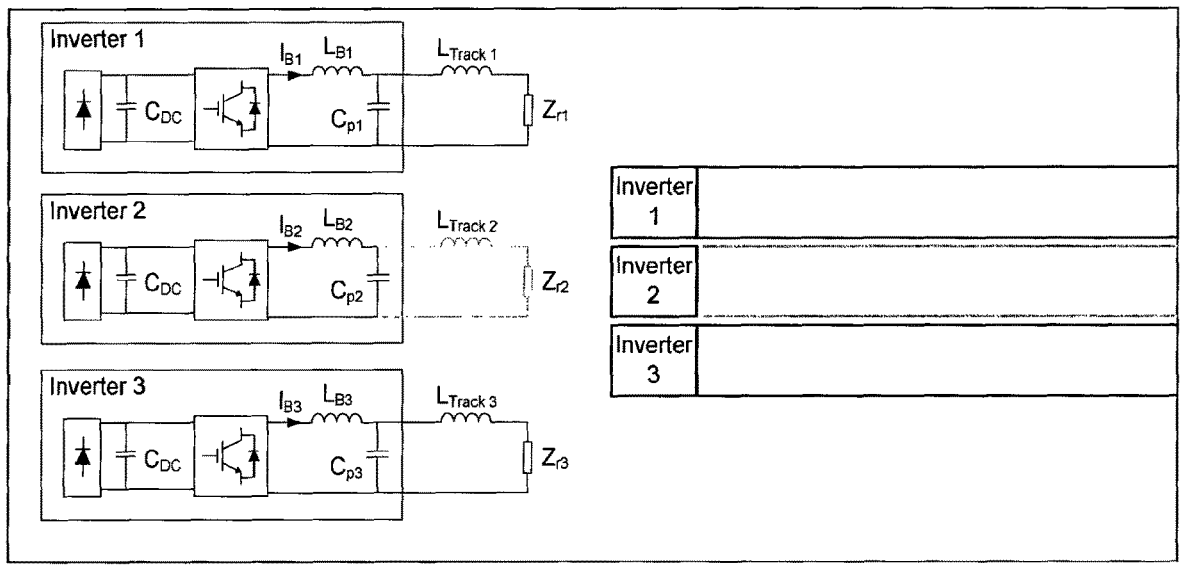
FIG. 8A shows the arrangement of the inverters and LCL networks for the repeated single phase track of FIG. 7

FIG. 7 shows a double conductor repeated single-phase track. Although track 140 is similar to track 120 shown in FIG. 5, track spacing 148 is substantially less than track spacing 134, and may be practically zero or some small value in relation to the width of the track. The track loops are driven using an LCL network, as shown in FIG. 8A.

FIG. 8 shows the polarity of track 140, as taken through line 8-8' of FIG. 7. Symbols 142a and 142b correspond to the lengths of conductor 142, and similarly for symbols 144a and 144b and symbols 146a and 146b, and conductors 144 and 146 respectively.

It should be noted that, unlike track 120, the polarity of adjacent lengths of loops of track 140 are the same, that is to say 142b and 144a, which correspond to adjacent lengths of loops 142 and 144 respectively, and 144b and 146a which correspond to adjacent lengths of loops 144 and 146, share the same polarity. This is to prevent mutual coupling, due to the reduced track spacing 148, however it is envisioned that track 140 could also have a similar polarity to track 120, whereby adjacent portions of the track have different polarity.

Figure 9:
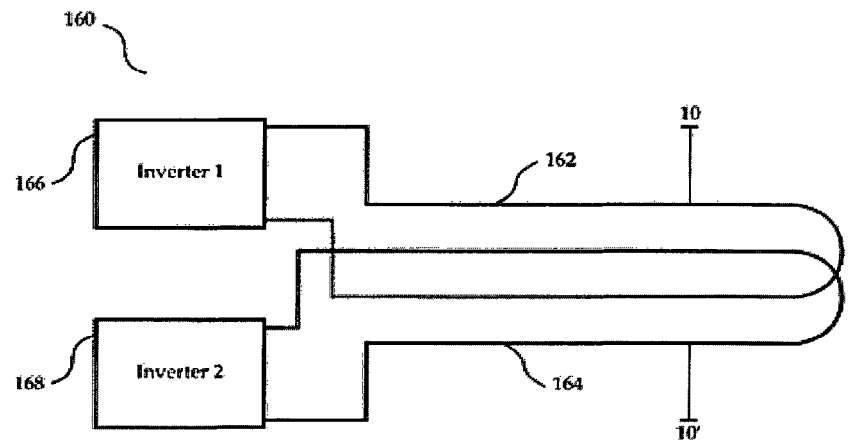
FIG. 9 is a diagram of a two-phase bipolar track.
Figure 9A:
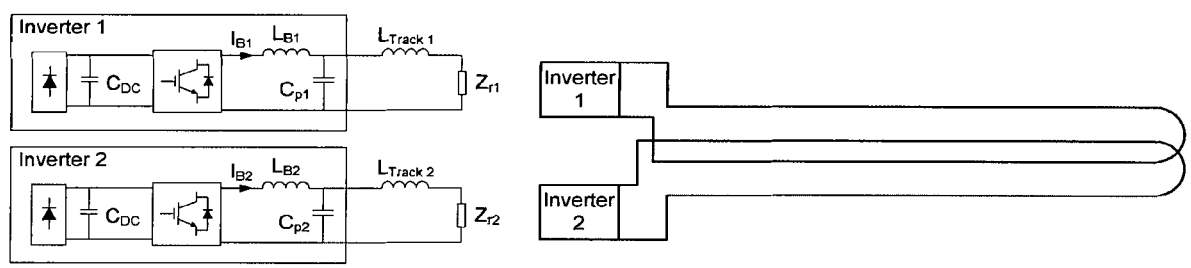
FIG. 9A is a diagram showing an arrangement for a two phase bipolar track (inverters being synchronised 90° out of phase) together with the arrangement for each inverter and LCL network.

FIG. 9 shows a two-phase bipolar track. Track 160 consists of two extended loops 162 and 164, comprising four conductors, the loops intersecting at their distal ends. The loops 162 and 164 are each driven by an independent inverter 166 and 168 respectively, and carry currents which are equal in frequency and magnitude, but electrically separate in phase by 180°. A rectifier may be used to provide a common DC bus. Inverters 166 and 168 are equal except for the phase shift, and both phases are tuned with an LCL network which provides a constant track current independent of the loading on that phase. This is desirable as the portion of the total load that is born by each phase will change as the position of the pickup changes across the width of the track. The current in each phase is equal and held constant by the power supply as well as the frequency of operation. The phases are driven by LCL networks as shown in FIG. 9A.

Figure 10:
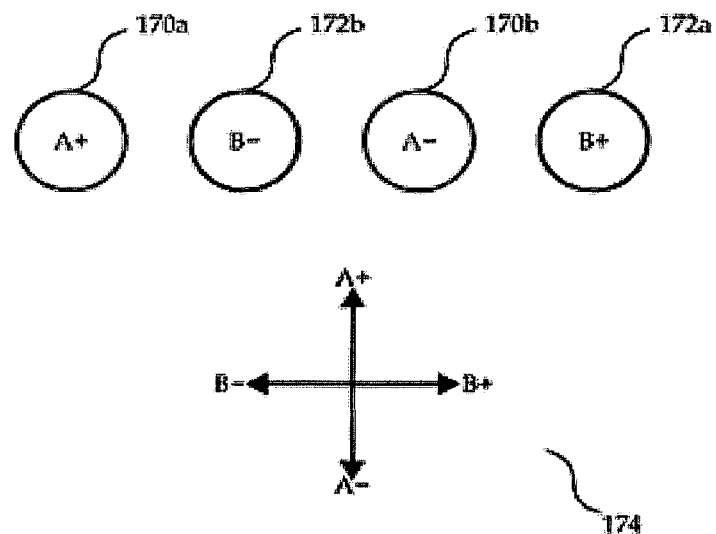
FIG. 10 is a diagram of the polarity of the track of FIG. 9, as taken along line 10-10'.

FIG. 10 shows the polarity of track 160, as taken through line 10-10' of FIG. 10. Symbols 170a and 170b correspond to conductor 162 and symbols 172a and 172b correspond to conductor 164. Phasor diagram 174 shows the relationship of the phases of track 160. Again, the loops are driven using LCL networks as shown in FIG. 11A.

Figure 11:
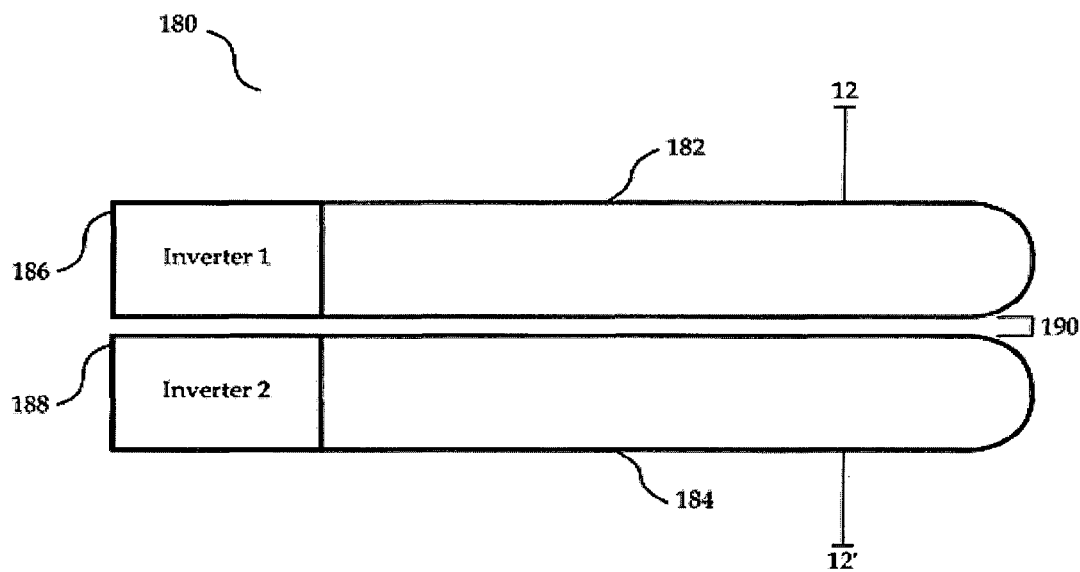
FIG. 11 is a diagram of a double conductor repeated single-phase track having two conductors.
Figure 11A:
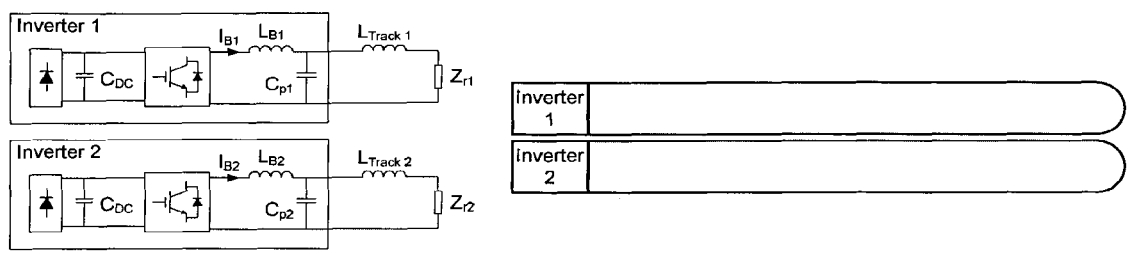
FIG. 11A shows the arrangement of inverters and LCL networks for the double conductor repeated single phase track of FIG. 11.

For better comparison with track 160, a two-loop double conductor repeated single-phase track is shown in FIG. 11. Track 180 is substantially similar to track 140, except that there are only two conductors, 182 and 184, forming two loops.

Figure 12:
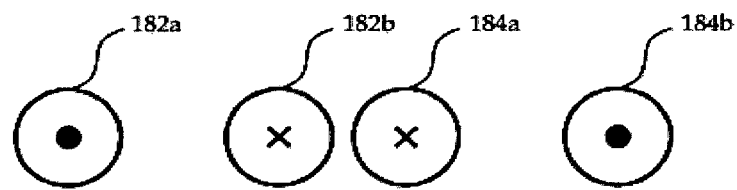
FIG. 12 is a diagram of the polarity of the track of FIG. 11, as taken along line 12-12'.

FIG. 12 shows the polarity of the conductors of track 180, as taken through line 12-12' of FIG. 11. Symbols 182a and 182b correspond to the lengths of conductor 182, and symbols 184a and 184b correspond to the lengths of conductor 184.

Comparisons

Referring now to FIGS. 13 to 17, there are shown graphs of open-circuit voltage ($V_{oc}$), short-circuit current ($I_{sc}$) and uncompensated power ($S_u$), showing the variation along the width of the track, for each of tracks 100, 120, 140, 160 and 180 respectively. A quadrature pick-up structure (see FIGS. 21 and 22) was used for the purposes of making the comparisons, at a height of 20 mm above the track. Pick-up structures are discussed further below.

Although it will be clear to those skilled in the art, it may be beneficial to have a smooth $S_u$ across a width of the track, to allow a pickup to be positioned at some offset from the centre. This may have particular relevance to pick-ups used in EVs, but also more generally.

Figure 21:
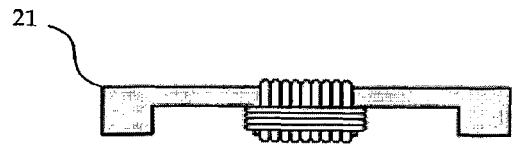
FIG. 21 is a diagram of a flat-E pickup.
Figure 22:
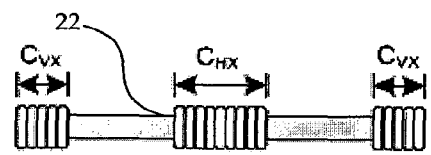
FIG. 22 is a diagram of a flat pickup.

It should further be noted that each graph shows the different spatial components of flux received by the quadrature pick-up structure of FIGS. 21 and 22. For convenience thus components are referred to as horizontal and vertical components of the magnetic field. These components are shown separately in each graph, as well as the total (i.e. the highest curve). As will become clear below, it may be beneficial for a pickup to be able to pick up both components, and therefore reference will generally be made to the total outputs, rather than the horizontal or vertical outputs. Pick-ups which make use of both horizontal and vertical components will be described below.

Figure 13:
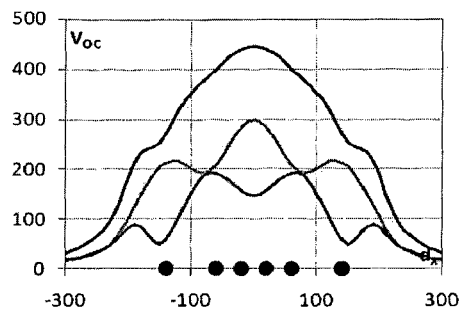
FIG. 13 is a set of graphs showing the (a) open-circuit voltage ($V_{oc}$), (b) short-circuit current ($I_{sc}$) and (c) uncompensated power ($S_u$) of the track shown in FIG. 3.
Figure 13:
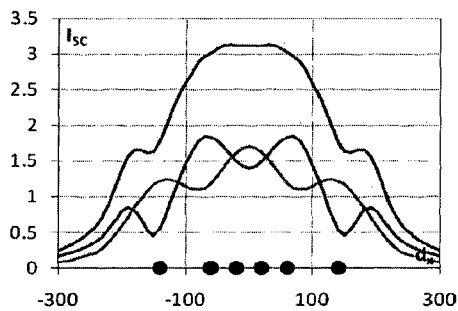
Figure 13:
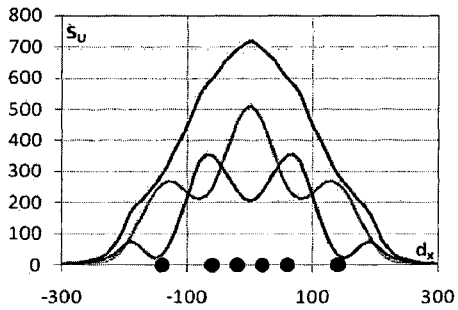
Figure 14:
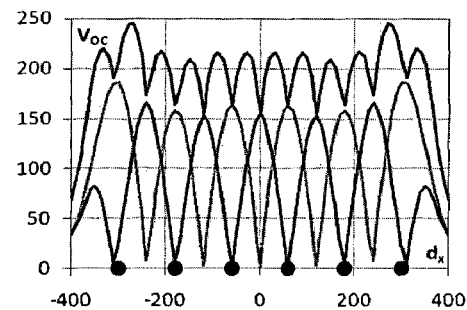
FIG. 14 is a set of graphs showing the (a) open-circuit voltage ($V_{oc}$), (b) short-circuit current ($I_{sc}$) and (c) uncompensated power ($S_u$) of the track shown in FIG. 5.
Figure 14:
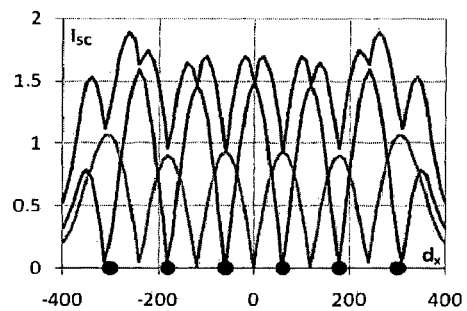
Figure 14:
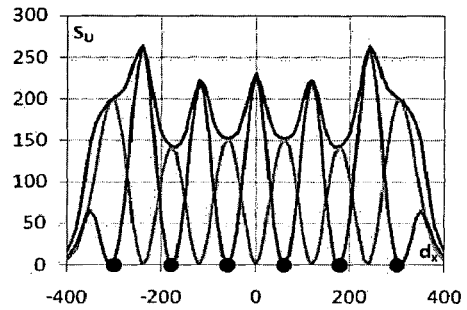

Turning specifically to FIGS. 13 to 15, it can be seen that track 100 and track 140 display generally superior power profiles when compared to track 120, in the sense that the maximum $S_u$ for track 120 is limited to less than 300 VA, whereas track 100 and track 140 have a much greater $S_u$, albeit at the cost of some lateral range.

This reduced lateral range could be compensated in single-phase tracks such as track 140, for example by adding additional loops, with little added complexity. It can therefore be seen that there is little benefit gained from using track 120 over track 100 or track 140.

The output profiles of track 100 and track 140 are substantially similar. As poly-phase tracks, such as track 100, require extra compensation for the mutual inductance between phases, a single-phase layout may be preferred for many applications. Track 140 therefore displays significant benefits.

Figure 17:
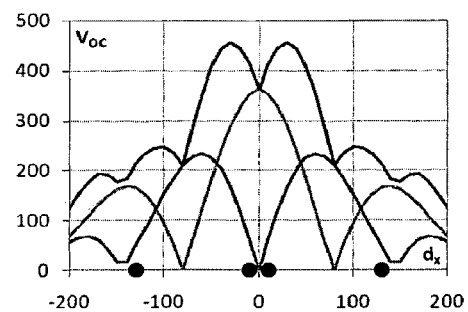
FIG. 17 is a set of graphs showing the (a) open-circuit voltage ($V_{oc}$), (b) short-circuit current ($I_{sc}$) and (c) uncompensated power ($S_u$) of the track shown in FIG. 11.
Figure 17:
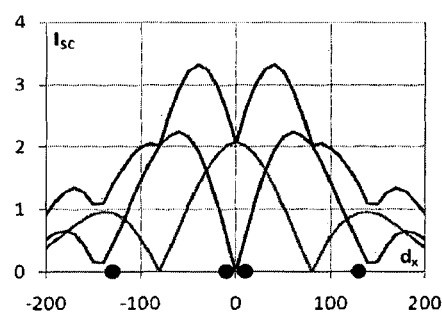
Figure 17:
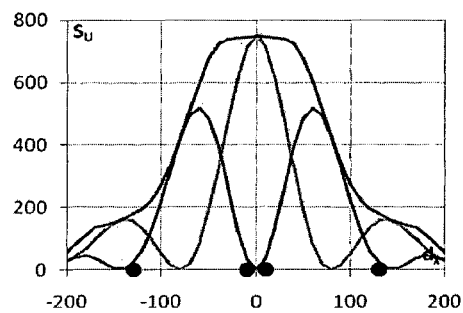

Turning now to the graphs in FIGS. 16 and 17, it can be seen that track 180 displays a generally superior power profile to track 160, and a somewhat greater lateral range. There is therefore clearly a benefit to using the single-phase track 180, rather than the two-phase track 160.

Figure 18C:
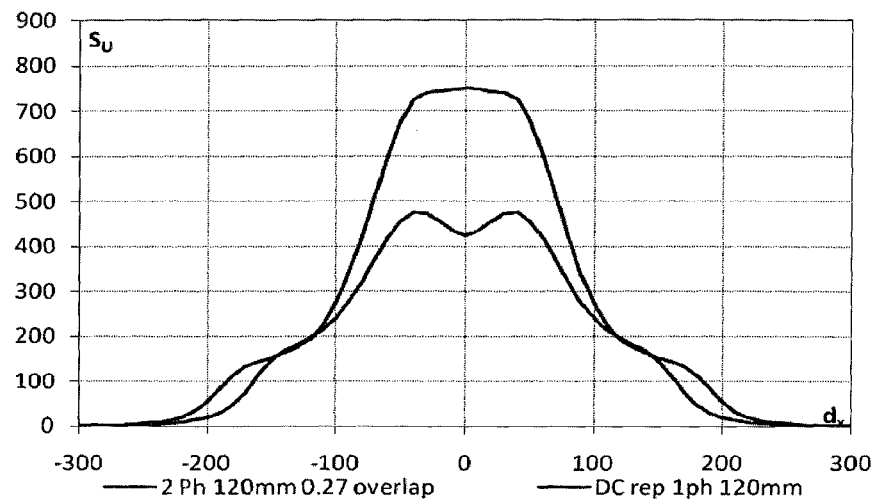
FIG. 18C is a graph showing the comparison between a four wire double conductor repeated single phase track of FIG. 11 and a two phase bipolar track with 0.29 overlap such as the track of FIG. 9.

On the whole therefore, it can be seen that single-phase tracks show generally superior power profiles, improved $S_u$ and a more flexible width. Further, within single-phase tracks, a double conductor repeated single-phase arrangement, such as track 140 and track 180, may be generally preferred over the alternatives. This is shown in FIG. 18C which shows a comparison between a four wire double conductor (i.e. two loop) repeated single phase track and a two phase bipolar track with 0.29 overlap.

Power Source

As shown in FIG. 7, each of loops 142, 144 and 146 may be connected to separate inverters 150, 152 and 154 respectively.

Figure 18D:
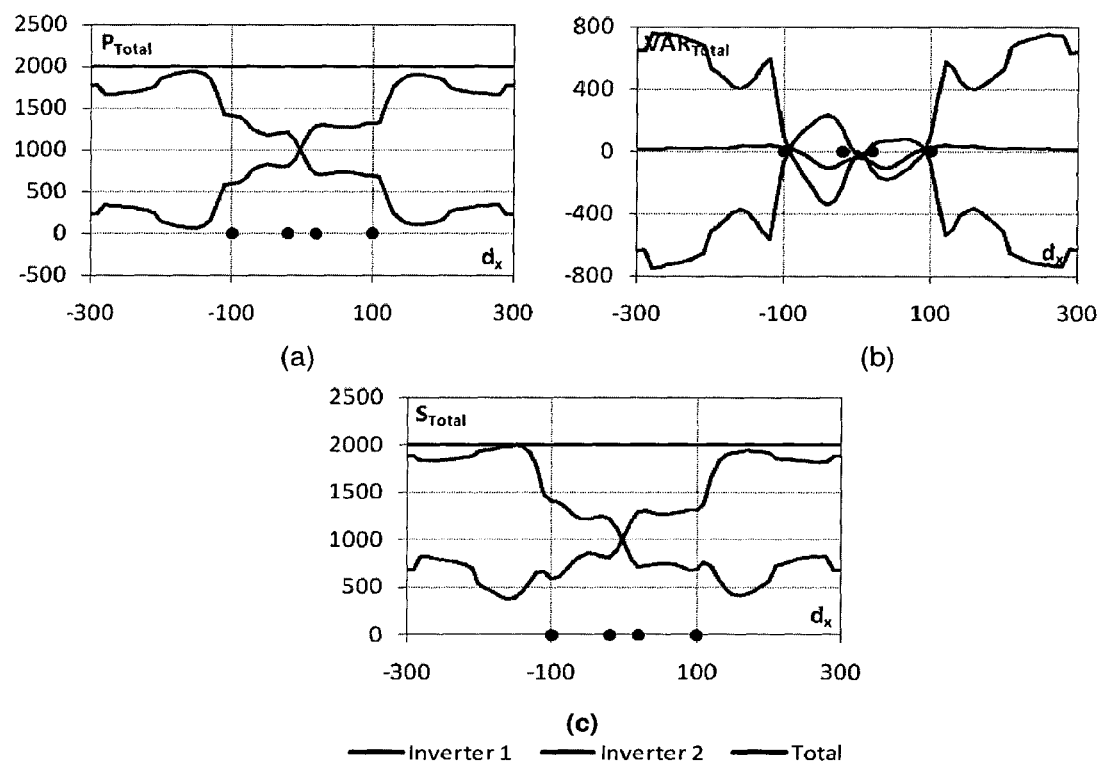
FIG. 18D is a set of graphs showing (a) real, (b) reactive and (c) total power supplied by each inverter to a paralleled tuned quadrature pick-up (including ferrite effect) operating at 2 kilowatts above a two phase bipolar track with 120 mm track spacing 0.29 overlap (i.e. a track arrangement corresponding to that shown in FIG. 9.
Figure 18E:
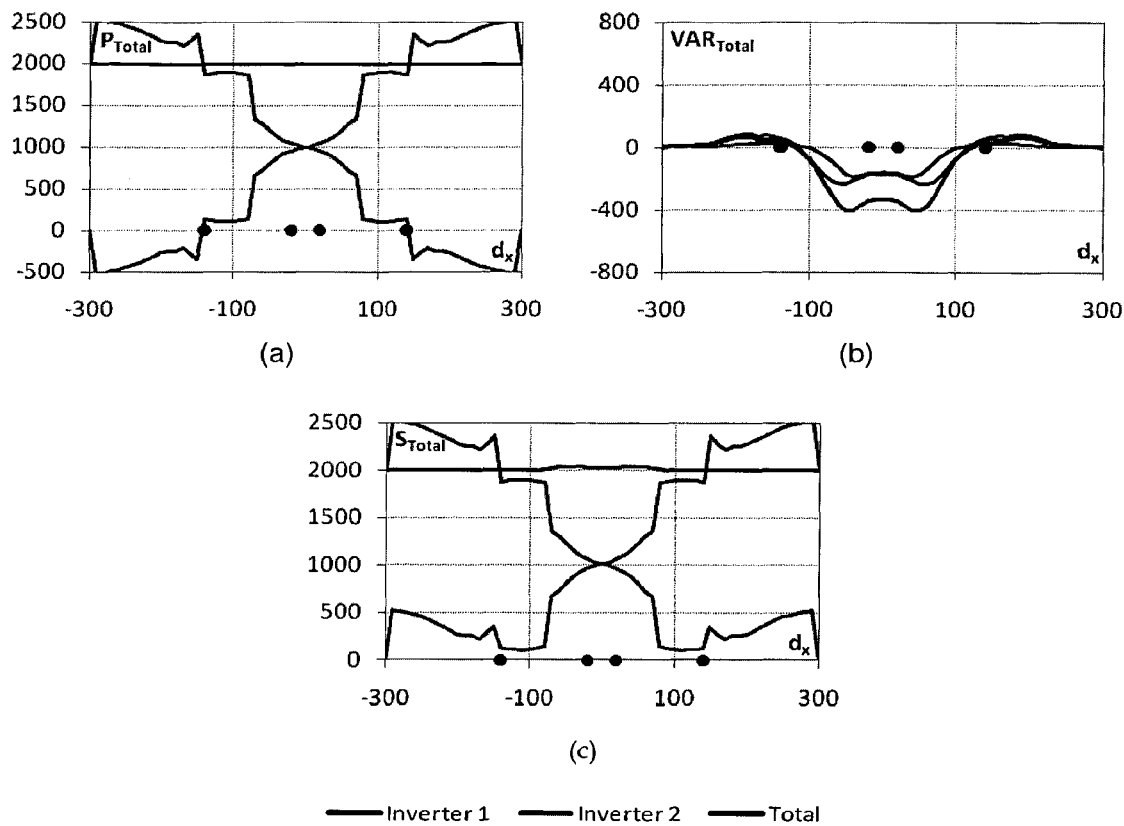
FIG. 18E is a set of graphs showing (a) real, (b) reactive and (c) total power supplied by each inverter to a parallel tuned quadrature pick-up (including ferrite effect) operating at 2 kilowatts above a four wire double conductor repeated single phase track with 120 mm track spacing (20 mm between double conductors) i.e. a track corresponding to that shown in FIG. 11.

However, referring now to FIG. 18A showing results for a series tuned, pick-up (which reflects an inductive load onto the track) and FIG. 18B showing the results for a parallel tuned track pick-up (which reflects a capacitive load onto the track). The track arrangements each have three separate inverters. It can be seen from the Figures that the use of separate inverters is not preferable. In particular, it can be seen, particularly at the edges of the lateral range, that inverters 150 and 154 may need to be rated for a greater output than the total output, which may lead to increased costs in manufacturing the system. Further, as each loop is powered by a single inverter, the failure of any one of the inverters may compromise the system as a whole, by introducing null zones. FIG. 18D shows real, reactive and total power supplied by each inverter to a parallel tuned quadrature pick-up above a two phase bipolar track. FIG. 18 E shows real, reactive and total power supplied by each inverter to a parallel tuned quadrature pick-up above a four wire double conductor repeated single phase track. It can seen that the VAR load on the two phase track is quite undesirable, with the capacitive load on one inverter and an inductive load on the other, reaching + or −300 VAR over the + or −50 mm operating range. In comparison, the VAR load on the double conductor repeated single phase track is a smooth capacitive load profile of −200 VAR per track loop. It is clear that the double conductor repeated single phase track is preferable for tracks with four conductors.

An alternative track arrangement is shown in FIG. 19. Track 200 is formed of a single conductor 202. Conductor 202 is arranged so as to form three loops (although, more or fewer loops may be used, as would be clear to those skilled in the art). This is done by conductor 202 overlapping itself at points 204 and 206, however the position of points 204 and 206 is not fixed, and may be at any appropriate location along conductor 202. As the overlap necessarily increases the height of the track at those points, track 200 may require additional vertical clearance. The distance between adjacent portions of the conductor may be reduced to a smaller value, so as to retain the benefits of the double conductor repeated single-phase track as previously detailed.

Conductor 202 is attached at its ends to power source 208. Power source 208 will preferably include a number of inverters connected in parallel. This adds resilience to the system, in that should one of the inverters may fail, the remaining functional inverters will be able to take on a greater load to avoid the system being compromised.

Track 200 will have the same power output as track 120, however as the inverters are connected in parallel, each inverter need only be rated to take a fraction of the total load. For example, if there are three inverters (as shown in FIG. 19 by way of example), each inverter need only be rated to take about one-third of the total load. This may reduce costs in manufacturing the system, by allowing the use of lower rated components. Thus one or more inverters may be used to share the load across the loops (whether the loops are formed using a single conductor or multiple conductors) that form the repeated single phase track arrangement.

Figure 19B:
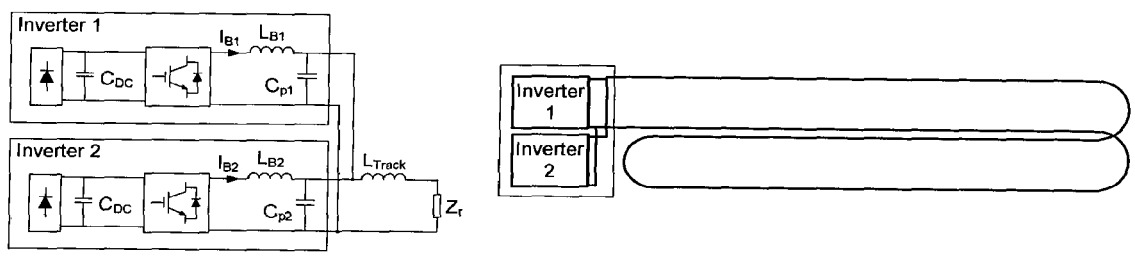
FIG. 19B shows an alternative arrangement for a single phase double conductor repeated track, together the inverter and LCL network.
Figure 20:
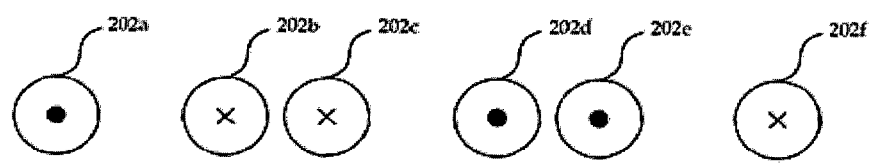
FIG. 20 shows the polarity of the track shown in FIG. 19, as taken along line 20-20'.

Power source 208 may also be limited to a single inverter, which need only be rated to take the whole load, avoiding the problem with track 120. An analogous track formed from two loops is shown in FIG. 19B.

Pickup

As previously noted, it may be beneficial to use a pickup adapted to make use of both the components of magnetic flux that are in spatial quadrature (referred to herein for convenience as the horizontal and vertical components of the magnetic flux) generated by the IPT track, as opposed to standard pickups which make use of only one component.

The simplest of these is known as a quadrature pickup, which is achieved by winding two coils on the pickup core.

There are two ways of achieving the quadrature winding. The first is to wind the second coil physically in quadrature with the first coil, which requires the use of a flat-E core 5, as shown in FIG. 21. The second option is to wind two individual coils on a standard flat core 6, one at each end, as shown in as shown in FIG. 22. If these coils are connected in series but 180° out of phase, they will also allow the capture of the vertically oriented flux. Regardless of which topology is chosen, each of the quadrature coils can be individually tuned, their outputs combined and the output controlled with a single switched-mode controller.

Figure 23:
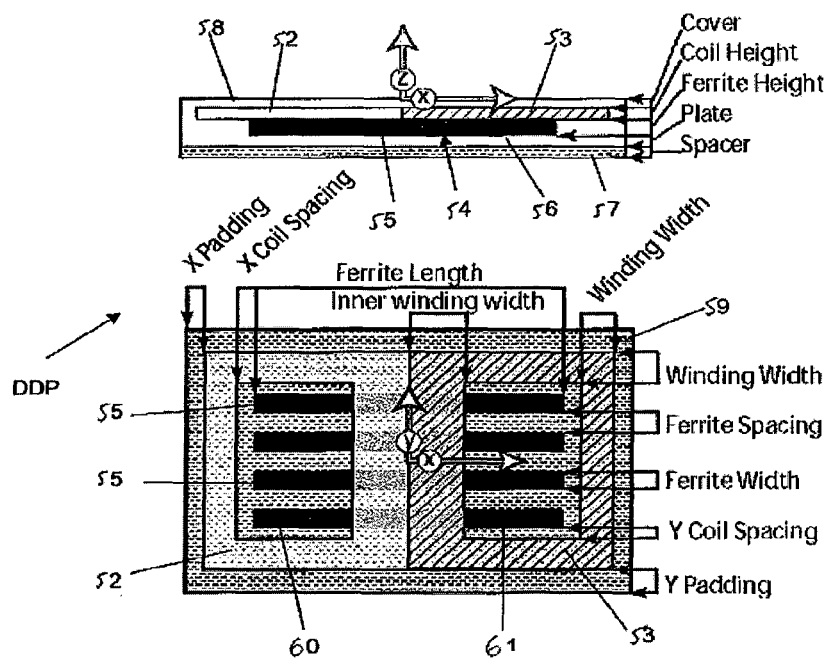
FIG. 23 is a side view and a plan view of a magnetic flux receiver pad.

Referring to FIG. 23, a magnetic flux pad construction previously disclosed by Boys, Covic, Huang and Budhia is shown which has excellent characteristics suitable for vehicle applications. The construction of FIG. 23 has been published in international patent publication WO2010/

090539A1. For convenience, this general construction is referred to herein as a DDP pad.

The DDP pad shown in FIG. 23 generally comprises two substantially coplanar coils referenced 52 and 53 which are magnetically associated with and sit on top of, a core 54. The pad will in practice be inverted so that the coils face the primary track. As can be seen from the FIG. 23, the core 54 may consist of a plurality of individual lengths of permeable material such as ferrite strips or bars 55 which are arranged parallel to each other but spaced apart. The pad construction may include a spacer 56 on which the core is located, and a plate 57 below the spacer. In some embodiments a cover 58 may be provided on the other surface of the flat coils 52 and 53. Padding 59 may be provided about the periphery of the pad. As can be seen, the coils 52 and 53 each define a pole area 60 and 61 respectively. This DDP pad construction as shown in FIG. 23 may be used as a flux receiver which may be used in a PU for the track topologies described in this document.

Figure 24:
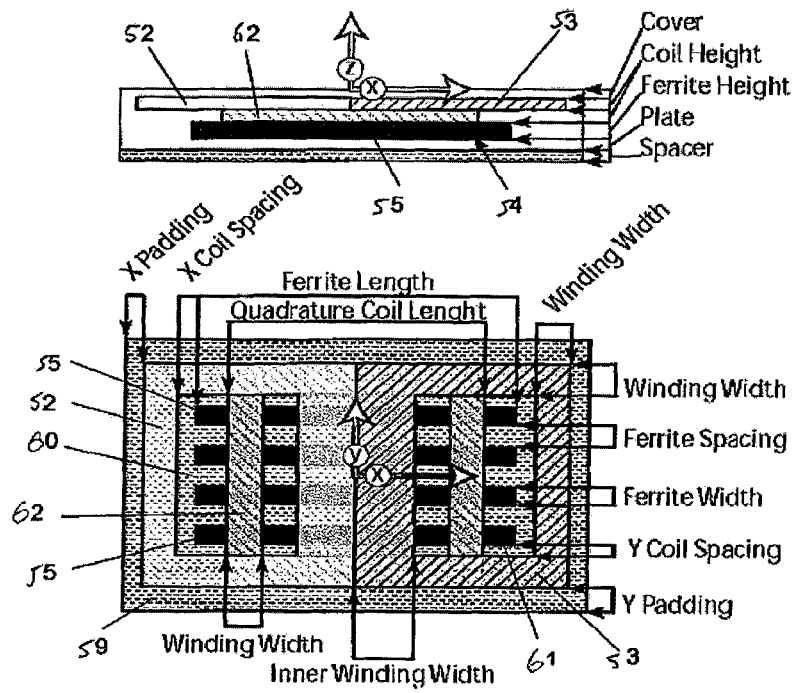
FIG. 24 is a side view and a plan view of the pad of FIG. 23, including a quadrature coil.

Turning now to FIG. 24, the DDP construction of FIG. 23 is shown but further including a quadrature coil 62 (referred to herein as a DDPQ pad). This construction is also described in patent publication WO2010/090539A1. The quadrature coil extends the power transfer profile when there is lateral movement of the construction shown in FIG. 24 with respect to a flux generator such as the DDP pad of FIG. 23 when energised by an appropriate inverter. The quadrature coil allows power to be extracted from the "vertical" component of the magnetic field that the receiver pad intercepts while the other coils 52, 53 facilitate power extraction from the "horizontal" component of the flux intercepted. Therefore, the construction of FIG. 24 is suited as a flux receiver which may be used in a PU for the track topologies described in this document.

Figure 25:
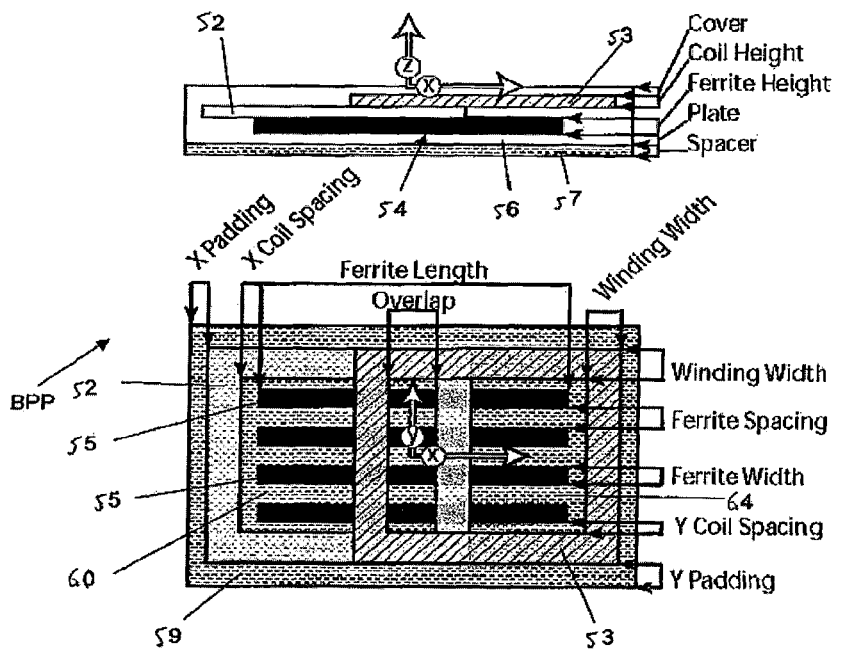
FIG. 25 is a side view and a plan view of an alternative form of magnetic flux receiver pad.

Turning now to FIG. 25, another flux receiver construction is shown which is referred to in this document as a bi-polar receiver pad or, alternatively, as a BPRP. The BPRP pad has a similar construction to the DDP discussed with respect to FIGS. 23 and 24 above. In one embodiment the BPRP pad consists, from bottom up, of an aluminium plate 57, a dielectric spacer 56, a core 54 comprising four rows of ferrite bars 55 (referred to herein as ferrites), two flat substantially coplanar, yet overlapping and ideally "rectangular" shaped coils 52, 53 (although in practice these are more oval due to the ease in winding Litz wire) spread out in the lateral direction, and a dielectric cover 58. The core 54 acts as a shield so that ideally all flux is channelled through the core 54 through the top of the pad. The plate 57 merely acts to a) eliminate and small stray or spurious fields that may be present above the core 4 in certain environments, and b) provide additional structural strength.

The magnetic structure of the BPRP is designed so that there is substantially no mutual coupling between either of the coils 52, 53 in the primary. This allows the coils to be tuned independently at any magnitude or phase without coupling voltage into each other, which if present would oppose the power output of such a coil. Each coil can be independently tuned and regulated without affecting the flux capture and power transfer of the other coil. Thus the BPRP is suited as a flux receiver which may be used in a PU for the track topologies described in this document.

Although the pick-up structures described above with reference to FIGS. 23 to 25 use strips of ferromagnetic material, it will be appreciated that the amount and arrangement of ferromagnetic material may vary significantly depending on the required application. For example, in some embodiments there may be no ferrite, and in others there may be a full sheet.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Wherein the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the scope of the invention.

The invention claimed is:

1. An IPT track arrangement comprising:
at least one inverter, the at least one inverter including a first inverter; and
at least one conductor, the at least one conductor including a first conductor electrically connected to the first inverter, wherein
the at least one conductor forms at least a first loop and a second loop of the IPT track arrangement, the first loop and the second loop located adjacent one another and in a plane, the first loop having a first portion that is parallel and adjacent to a second portion of the second loop,
the IPT track arrangement is configured so that respective polarity of current flow in the adjacent first and second portions of the loops is the same, wherein the respective polarity of current flow in the adjacent first and second portions of the loops results in a reduction of an opposition of magnetic flux between the first and second conductor portions,
the at least one inverter includes a second inverter,
the at least one conductor includes a second conductor, the second conductor electrically connected to the second inverter,
the second conductor forms at least a third loop, the third loop having a third portion, a portion of the first loop being parallel and adjacent to the third portion,
the first inverter provides first current to the first conductor,
the second inverter provides second current to the second conductor, and
at least one of:
the IPT track arrangement is configured so that when the first and second currents are out of phase as to each other, the respective polarities of the respective current flows in the third portion and the portion of the first loop parallel and adjacent to the third portion are the same; or the IPT track arrangement is configured so that when the first and second currents are in phase as to each other, the respective polarities of the respective current flows in the third portion and the portion of the first loop parallel and adjacent to the third portion are the same.

2. The IPT track arrangement of claim 1 wherein:
the first conductor overlaps itself at a plurality of crossing points.

3. The IPT track arrangement of claim 2, wherein the second loop is formed of the same conductor as the first loop.

4. The IPT track arrangement of claim 2, wherein the at least one conductor includes a plurality of conductors, and wherein the second loop is formed of a different conductor of the plurality of conductors than that forming the first loop.

5. The IPT track arrangement of claim 1, wherein:
the third loop is located in the plane of the first and second loops.

6. The IPT track arrangement of claim 1 wherein:
the first conductor overlaps itself at a plurality of crossing points.

7. The IPT track arrangement of claim 6 wherein:
the second conductor overlaps itself at a plurality of crossing points.

8. The IPT track arrangement of claim 2, wherein:
the first conductor is the only conductor forming the first and second loops.

9. The IPT track arrangement of claim 2, wherein:
the at least one inverter includes a third inverter; and
the first inverter and the third inverter provide current to the first conductor.

10. A system, comprising:
the IPT track arrangement of claim 1; and
an IPT pickup, wherein
the pickup pad is located adjacent at least the first conductor.

11. The system of claim 10, wherein:
the IPT pickup includes a DDP pad.

12. The system of claim 10, wherein:
the IPT pickup includes a DDPQ pad.

13. The IPT track arrangement of claim 1 wherein:
the IPT track arrangement is a single-phase track arrangement.

14. The IPT track arrangement of claim 1 wherein:
the IPT track arrangement is a unipolar track arrangement.

15. The IPT track arrangement of claim 1 wherein:
the at least one conductor is insulated.

16. An IPT track arrangement comprising:
at least one inverter, the at least one inverter including a first inverter; and
at least one conductor, the at least one conductor including a first conductor electrically connected to the first inverter, wherein
the at least one conductor forms at least a first loop and a second loop of the IPT track arrangement, the first loop and the second loop located adjacent one another and in a plane, the first loop having a first portion that is parallel to and within 200 mm of a second portion of the second loop,
the IPT track arrangement is configured so that respective polarity of current flow in the adjacent first and second portions of the loops is the same, wherein the respective polarity of current flow in the adjacent first and second portions of the loops results in a reduction of an opposition of magnetic flux between the first and second conductor portions, the at least one inverter includes a second inverter,
the at least one conductor includes a second conductor, the second conductor electrically connected to the second inverter,
the second conductor forms at least a third loop, the third loop having a third portion, a portion of the first loop being parallel and adjacent to the third portion,
the first inverter provides first current to the first conductor,
the second inverter provides second current to the second conductor, and
at least one of:
the IPT track arrangement is configured so that when the first and second currents are out of phase as to each other, the respective polarities of the respective current flows in the third portion and the portion of the first loop parallel and adjacent to the third portion are the same; or
the IPT track arrangement is configured so that when the first and second currents are in phase as to each other, the respective polarities of the respective current flows in the third portion and the portion of the first loop parallel and adjacent to the third portion are the same.

17. The IPT track arrangement of claim 16, wherein:
wherein the first portion and the second portion are within 100 mm of each other.

18. The IPT track arrangement of claim 16, wherein:
wherein the first portion and the second portion are within 20 mm of each other.

19. The IPT track arrangement of claim 1, wherein:
wherein the first portion and the second portion are within 20 mm of each other.

20. The IPT track arrangement of claim 1 wherein:
the at least one conductor is configured so that the at least one conductor is usable for a track current of 125 A.

21. The IPT track arrangement of claim 1 wherein:
the IPT track arrangement is a three-phase track arrangement.

22. The IPT track arrangement of claim 1 wherein:
the at least one conductor is a single conductor that overlaps with itself at only two locations.

23. The IPT track arrangement of claim 1 wherein:
the first loop has a fourth portion and the second loop has a fifth portion, the fifth portion and the fourth portion being parallel to one another and located at least an order of magnitude further from one another than the first portion is located from the second portion.

24. The IPT track arrangement of claim 1 wherein:
the IPT track is a vehicle IPT track.

25. The IPT track arrangement of claim 24 wherein:
the IPT track is configured so that the first portion and the second portion extend in a direction of driving of a vehicle.

26. The IPT track arrangement of claim 24 wherein:
the IPT track is configured so that the respective polarity of current flow in the adjacent first and second portions of the loops being the same enhances lateral range of the track relative to that which would otherwise be the case.

27. The IPT track arrangement of claim 24 wherein:
the respective polarity of current flow in the adjacent first and second portions of the loops being the same enhances lateral range of a vehicle driving on the track relative to that which would otherwise be the case.

28. The IPT track arrangement of claim 1 wherein:
the first and second portions extend in a longitudinal direction of the track.

29. The IPT track arrangement of claim 1 wherein:
the at least one conductor includes a third conductor, the third conductor forming the second loop; and
the first conductor forms the first loop.

30. The IPT track arrangement of claim 1 wherein:
the first conductor forms the first loop and the second loop.

\* \* \* \* \*